(12) United States Patent
Kons

(10) Patent No.: US 12,340,794 B2
(45) Date of Patent: Jun. 24, 2025

(54) LANGUAGE IDENTIFICATION CLASSIFIER TRAINED USING ENCODED AUDIO FROM ENCODER OF PRE-TRAINED SPEECH-TO-TEXT SYSTEM

(71) Applicant: International Business Machines Corporation, Armonk, NY (US)

(72) Inventor: Zvi Kons, Yoqneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 17/874,899

(22) Filed: Jul. 27, 2022

(65) Prior Publication Data

US 2024/0038216 A1 Feb. 1, 2024

(51) Int. Cl.
*G10L 15/00* (2013.01)
*G06F 40/20* (2020.01)
(Continued)

(52) U.S. Cl.
CPC ............ *G10L 15/063* (2013.01); *G06F 40/20* (2020.01); *G10L 15/26* (2013.01)

(58) Field of Classification Search
CPC ....... G10L 15/063; G10L 15/26; G10L 15/22; G10L 15/005; G10L 15/01; G10L 15/16; G10L 15/06; G10L 2015/0636; G10L 2015/0635; G10L 2015/0638; G10L 15/075; G10L 15/07; G10L 15/08; G10L 15/083; G10L 15/197; G10L 15/193; G10L 15/19; G10L 15/183; G10L 15/187; G10L 15/18; G10L 2015/221; G10L 15/222; G10L 2015/225; G10L 15/30; G10L 15/32; G10L 15/34; G10L 15/28; G10L 17/04; G10L 17/02; G10L 17/10; G10L 17/12; G10L 17/08; G10L 17/14; G10L 17/18; G10L 17/20; G10L 2021/0135; G10L 21/013; G10L 21/01; G10L 21/007; G10L 21/003; G10L 21/0272; G10L 25/18; G10L 25/21; G10L 25/24; G10L 25/30; G10L 25/69; G10L 25/60; G10L 2025/783;
(Continued)

(56) References Cited

U.S. PATENT DOCUMENTS 11,238,845 B2 2/2022 Chen et al.
2017/0011734 A1 1/2017 Ganapathy et al.
(Continued)

FOREIGN PATENT DOCUMENTS

| CN | 117475996 A | 1/2024 | |
|----|----|----|----|
| JP | 2024-018989 A | 2/2024 | |
| WO | WO-2020113031 A1 * | 6/2020 | ............. G06N 3/044 |

OTHER PUBLICATIONS

Kons, Zvi et al. "Extending RNN-T-based speech recognition systems with emotion and language classification." arXiv preprint arXiv:2207.13965 (2022). (Year: 2022).*
(Continued)

*Primary Examiner* — Edgar X Guerra-Erazo
(74) *Attorney, Agent, or Firm* — Michael A. Petrocelli

(57) ABSTRACT

An example system includes a processor to receive encoded audio from an encoder of a pre-trained speech-to-text (STT) model. The processor is to further train a language identification (LID) classifier to detect a language of the encoded audio using training samples labeled by language.

17 Claims, 8 Drawing Sheets

(51) Int. Cl.
*G10L 15/06* (2013.01)
*G10L 15/26* (2006.01)

(58) Field of Classification Search
CPC ......... G10L 25/78; G10L 25/93; G06F 40/20;
G06F 40/289; G06F 40/253; G06F
40/263; G06F 40/268; G06F 40/56; G06F
40/55; G06F 40/58; G06F 40/53; G06F
40/51; G06F 40/42; G06F 40/45; G06F
40/47; G06N 20/20; G06N 3/02; G06N
3/044; G06N 3/0442; G06N 3/045; G06N
3/0455; G06N 3/0464; G06N 3/0475;
G06N 3/048; G06N 3/08; G06N 3/084;
G06N 3/082; G06N 3/088; G06N 3/0895;
G06N 3/09; G06N 3/091; G06N 3/092;
G06N 3/094; G06N 3/096; G06N 3/098;
G06N 3/0985; G06N 20/00; G06N 20/10;
G06N 7/023; G06N 7/02
See application file for complete search history.

(56) References Cited

U.S. PATENT DOCUMENTS

| 2018/0067918 | A1 | 3/2018 | Bellegarda et al. | |
|---|---|---|---|---|
| 2020/0380215 | A1* | 12/2020 | Kannan | G10L 15/005 |
| 2021/0005183 | A1* | 1/2021 | Lee | G10L 15/16 |
| 2023/0306958 | A1* | 9/2023 | Zhang | G06N 3/0455 |

OTHER PUBLICATIONS

Joshi et al., "Mutliple Softmax Architecture for Streaming Multilingual End-to-End ASR Systems", Microsoft Corporation, Interspeech 2021, Aug. 30, 2021-Sep. 3, 2021, 5 pages.

Punjabi et al., "Joint ASR and Language Identification Using RNN-T: An Efficient Approach to Dynamic Language Switching", Alexa Machine Learning, Amazon, 2021, IEEE, Downloaded Feb. 9, 2022, pp. 7218-7222.

Punjabi et al., "Streaming End-to-End Bilingual ASR Systems with Joint Language Identification", Alexa Machine earning, Amazon, Jul. 8, 2020, 5 pages.

Waters et al., "Leveraging Language ID in Multilingual End-to-End Speech Recognition", Google Inc., USA, IEEE, 2019, Downloaded Mar. 3, 2022, pp. 928-935.

Aronowitz et al., "Towards a Common Speech Analysis Engine.", arXiv:2203.00613, IBM Research AI, May 1, 2022, 05 pages.

Baevski et al., v"wav2vec 2.0: A Framework for Self-Supervised Learning of Speech Representations", DOI: 10.48550/ARXIV.2006. 11477. URL: https://arxiv.org/abs/2006.11477, Oct. 22, 2020, 19 pages.

Hsu et al., "HuBERT: Self-Supervised Speech Representation Learning by Masked Prediction of Hidden Units", 2021. doi: 10.48550/ ARXIV. 2106.07447. URL: https://arxiv.org/abs/2106.07447, Jun. 14, 2021, 10 pages.

Zhu et al., "Multilingual Speech Recognition with Self-Attention Structured Parameterization", Interspeech 2020, Oct. 25-29, 2020, 05 pages, http://dx.doi.org/10.21437/Interspeech.2020-2847.

* cited by examiner

400

600

LANGUAGE IDENTIFICATION CLASSIFIER TRAINED USING ENCODED AUDIO FROM ENCODER OF PRE-TRAINED SPEECH-TO-TEXT SYSTEM

BACKGROUND

The present techniques relate to language identification classification. More specifically, the techniques relate to training language identification classifiers.

SUMMARY

According to an embodiment described herein, a system can include a processor to receive an encoded audio from an encoder of a pre-trained speech-to-text (STT) model. The processor can also further train a language identification (LID) classifier to detect a language of the encoded audio using training samples labeled by language.

According to another embodiment described herein, a method can include receiving, via a processor, an encoded audio from an encoder of a pre-trained speech-to-text (STT) model. The method can further include training, via the processor, a language identification (LID) classifier to detect a language of the encoded audio using training samples labeled by language.

According to another embodiment described herein, a computer program product for training language identification classifiers can include computer-readable storage medium having program code embodied therewith. The computer readable storage medium is not a transitory signal per se. The program code executable by a processor to cause the processor to receive encoded audio from an encoder of a pre-trained speech-to-text (STT) model. The program code can also cause the processor to train a language identification (LID) classifier to detect a language of the encoded audio using training samples labeled by language.

DETAILED DESCRIPTION

Figure 1:
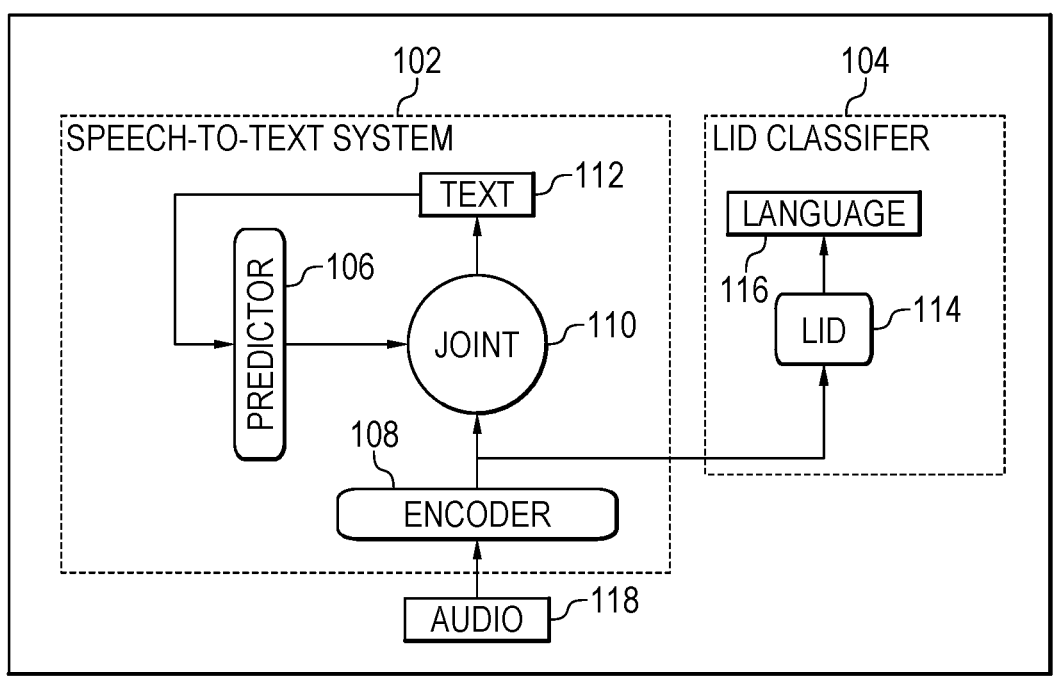
FIG. 1 is a block diagram of an example system for training a LID classifier using encoded audio from an encoder of a pretrained speech-to-text (STT) system.

Some speech transcription with a speech-to-text (STT) system use a single language model where the user selects an appropriate language based on some prior knowledge. However, sometimes the language of the speech may not be known in advance or is different from what was expected. This may result in a mismatch between the language of the input audio and an STT module and cause the STT module to produce incorrect transcription or no transcription at all. Moreover, applying a language classification tool on the audio to identify the language of the speech and then use a corresponding STT module may produce too much latency because the LID classifier may require several seconds of speech to identify the language correctly and the STT module may not start until this identification is complete. In addition, using multiple STT modules with each module having a different language in parallel may use much more computational resources because several models may need to be run at the same time. Finally, a multilingual STT trained on several languages at once may be hard to train and require additional processing resources. Moreover, such multilingual STTs may not be as accurate as single language models.

According to embodiments of the present disclosure, an example system includes a processor that can receive encoded audio from an encoder of a pre-trained speech-to-text (STT) model such as a Recurrent Neural Network Transducer (RNN-T). The processor can further train a language identification (LID) classifier to detect a language of the encoded audio using training samples labeled by language. Thus, embodiments of the present disclosure allow more efficient and accurate text transcription from speech in audio. In particular, using a model trained using the techniques described herein, state-of-the-art performance results were demonstrated for the NIST-LRE-07 dataset, released in October 2009, which includes 66 hours of conversational telephone speech segments for 14 languages. For example, an equal error rate (EER) of 0.56% was observed for the $10s$ condition. Moreover, the techniques enable quick identification of a language without waiting for the text decoding and enable identification with only minimal overhead and minimal latency. This allows the addition of a LID functionality to existing automated speech recognition (ASR) systems, without any change to their STT models. In some examples, the LID classifier may work as part of a single language STT module and used to indicate that input speech is not in an expected language before the STT module starts transcription. This indication may enable the STT module to switch to the model of the correct language with minimal overhead. In some examples, the LID classifier may operate as part of a multi-language model, where the LID classifier directs decoding to the correct language. In these examples, the overhead may also be minimal because a large part of resources is shared between the LID classifier and the STT module.

With reference now to FIG. 1, a block diagram shows an example system for training a LID classifier using encoded audio from an encoder of a pretrained STT system. The example system 100 of FIG. 1 includes a speech-to-text (STT) system 102. For example, the STT system 102 may be a Recurrent Neural Network Transducer (RNN-T) pretrained on speech in one language. The system 100 includes a language identification (LID) classifier 104 communicatively coupled to the STT system 102. The STT system 102 includes a predictor 106, an encoder 108 and a joint 110 network. For example, these three networks may have been trained on a particular language. As one example, the language may be American English. In various examples, the encoder 108 may be an acoustic encoder that converts audio into frame-level embedding features useful for STT. For example, the encoder 108 may have been trained in a supervised manner on labeled audio recordings. In various examples, the encoder 108 may be made of long short-term memory (LSTM) layers or a conformer encoder network. The STT system 102 also includes text 112 being shown generated from the output of the joint module 110. The LID classifier 104 includes a LID module 114 shown generating a detected language 116. The STT system 102 is shown receiving an audio 118. For example, the audio 118 may include speech in a particular language to be converted into text 112.

In the example of FIG. 1, during a training of the LID classifier 104, the encoder 108 may receive audio 118 and convert the audio 118 into a set of features. For example, the audio 118 may be part of a labeled training set that includes pairs of audio samples from various languages with labels indicating the language of each of the audio samples. As one example, the training set may be the NIST-LRE-07 dataset. In various examples, the generated features may be frame-level feature vectors. The LID 114 of the LID classifier 104 may receive the features and output a detected language 116. At training, the language 116 may then be compared with a label corresponding to the received audio 118 to train the LID 114. For example, one or more weights of the LID 114 may be adjusted based on the results of the comparison. In various examples, a backpropagation may then be used to adjust one or more weights of the LID 114. For example, one or more weights associated with any of the layers of the LID 114 described in greater detail in the example LID classifier 104 of FIG. 2 may be adjusted.

Still referring to FIG. 1, at an inference stage, the audio 118 received may be an audio in an unknown language to be converted into text 112. The encoder 108 may similarly convert the audio 118 into a set of features and send the features to the LID classifier 104. Based on the results of the LID classifier 104, the STT system 102 may then determine whether or not to continue processing the set of features from the encoder 108. For example, the STT system 102 may cancel the generation of text 112 in response to detecting that the detected language 116 is different than its target.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional audio samples, or additional predictors, encoders, classifiers, languages, etc.).

Figure 2:
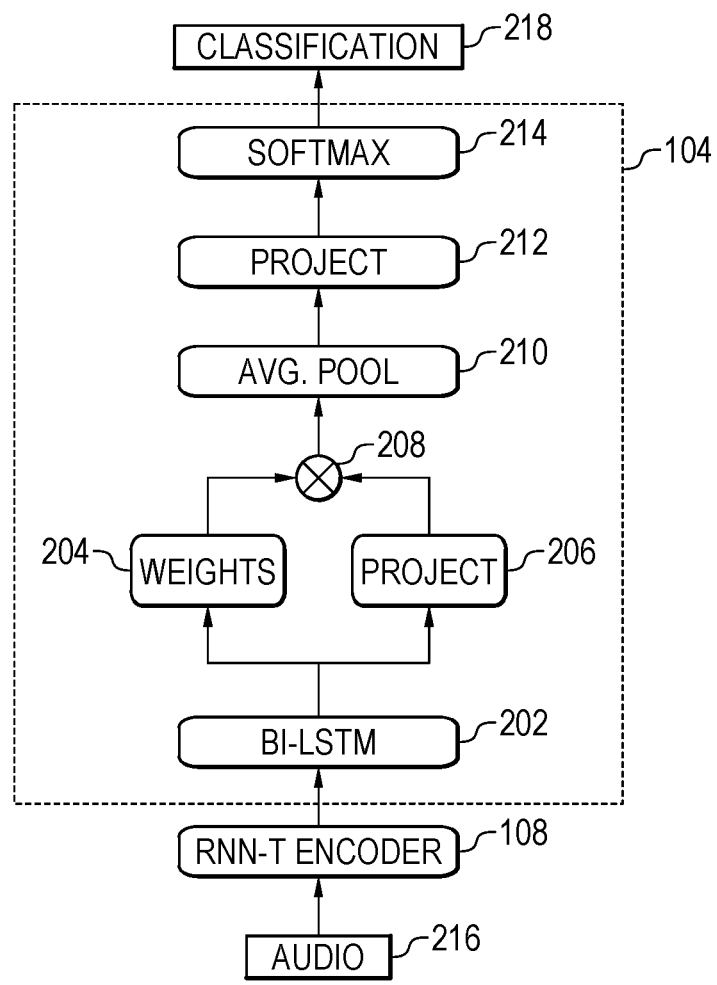
FIG. 2 is a detailed block diagram of an example system for training a LID classifier using encoded audio from an encoder of a pretrained STT system.

FIG. 2 is a detailed block diagram of an example system for training a LID classifier using encoded audio from an encoder of a pretrained STT system. The example system 200 of FIG. 2 includes an RNN-T encoder 108 communicatively coupled to a LID classifier 104. The LID classifier 104 includes a bi-directional long short-term memory (Bi-LSTM) layer 202. The LID classifier 104 includes weights 204 and linear projections 206 which are multiplied in multiplier 208. The LID classifier 104 also includes an average pooling layer 210. For example, the average pooling layer 210 may be a multi-head weighted-average pooling layer. The LID classifier 104 also further includes linear projections 212 and a softmax function 214. The RNN-T encoder 108 is shown receiving an audio 216. The LID classifier 104 is shown outputting a classification 218.

In the example of FIG. 2, the average pooling layer 210 may be a multi-head weighted-average pooling layer. For example, the average pooling layer 210 may be defined by the equations:

$$w_t = P_{r_2}(\sigma(P_{r_1}(x_t)))$$ Eq. 1

$$y = \frac{\sum_t e^{w_t} ReLU(P_{r_3}(x_t))}{\sum_t e^{w_t}}$$ Eq. 2 where $w_t$ is the weight vector for a frame, $x_t$ is the LSTM output vector at time t, $P_{r_1}(\ )$, $P_{r_2}(\ )$, and $P_{r_3}(\ )$ are linear projections, $\sigma(\ )$ is the log-sigmoid function, and y is the pooled weighted average.

Still referring to FIG. 2, a final probability for each language may calculated from the pooled weighted average y using a linear projection 212 and a softmax function 214. The softmax function 214 may receive a vector of real numbers and convert the n real numbers into a probability distribution of n possible outcomes. For example, the softmax function 214 may assign a probability to each class of a number n of language classes. The probabilities of all the language classes may add up to 1.0. In various examples, the output classification 218 may be the class with the highest decimal probability.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional audio samples, or additional classes, layers, classifications, etc.).

Figure 3:
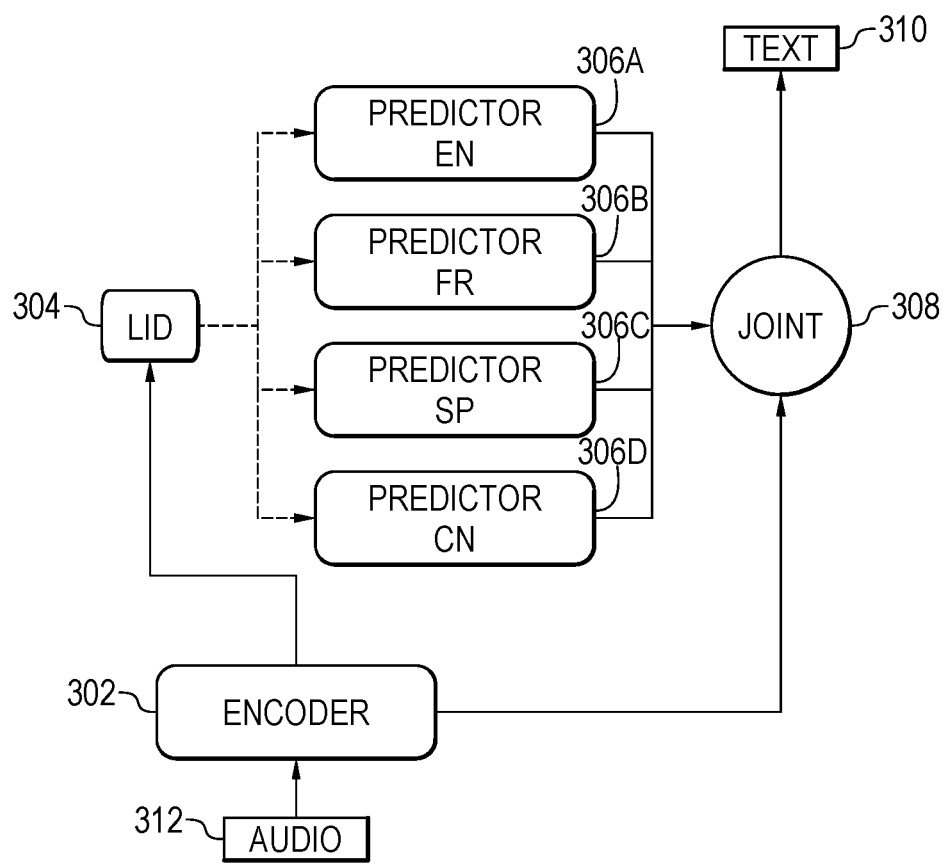
FIG. 3 is a block diagram of an example multi-lingual STT system including a trained LID classifier to detect and transcribe multiple languages using encoded audio from an encoder of a pretrained STT system.

FIG. 3 is a block diagram of an example multi-lingual RNN-T STT system 300 including a trained LID classifier to detect and transcribe multiple languages using encoded audio from its encoder. The example system 300 of FIG. 3 includes an encoder 302. The system 300 includes a LID classifier 304 communicatively coupled to the encoder 302. For example, the LID classifier 304 may be the example LID classifier 104 of FIG. 2. The system 300 also includes a set of predictors 306A, 306B, 306C, and 306D associated with the languages English, French, Spanish, and Chinese, respectively, and communicatively coupled to the LID classifier 304. The system 300 further includes a joint module 308 communicatively coupled to the encoder 302 and the predictors 306A, 306B, 306C, and 306D. The STT system 300 is shown generating text 310. For example, the text 310 may correspond to speech in received audio 312.

In the example of FIG. 3, the LID classifier 304 is trained to classify encoded audio from encoder 302 into one of several languages including English, French, Spanish, or Chinese. In various examples, any additional languages may be included or any of these languages may be excluded. At an inference stage, the LID classifier 304 may thus direct the encoded audio to a language model that corresponds to a classification with a highest probability. For example, the LID classifier 304 can classify a second encoded audio corresponding to an audio sample to be converted into text and then select a corresponding dedicated predictor of the predictors 306A, 306B, 306C, 306D based on the classification. For example, the LID classifier 304 may direct the encoded audio encoded to a language model that corresponds to a highest decimal probability among various language classes trained on the LID classifier 304.

Still referring to FIG. 3, the joint module 308 may receive a prediction from one of the predictors 306A-306D corresponding to the detected language and generate text 310 based on the prediction and the encoded audio from encoder 302. In this manner, audio of multiple languages may be processed using the same system 300.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional languages, predictors, or additional audio samples, generated text, etc.). For example, different predictors may also be used for variants of languages because of different spellings and different pronunciations. For example, the English predictor 306A may be replaced with an American English predictor and a British English predictor, each trained on a different English spelling and pronunciation.

Figure 4:
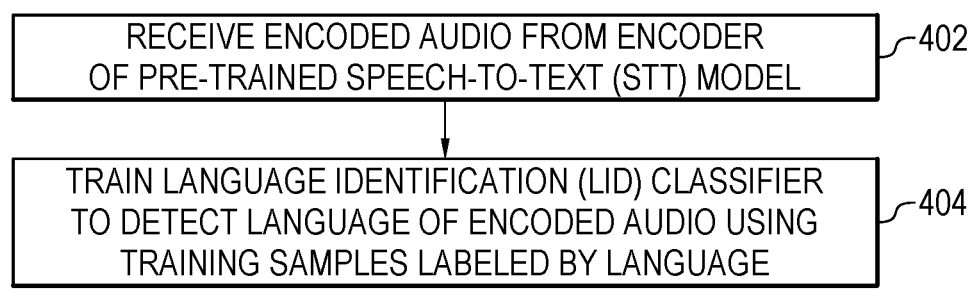
FIG. 4 is a process flow diagram of an example method that can train a LID classifier using encoded audio from an encoder of a pretrained STT system.
Figure 7:
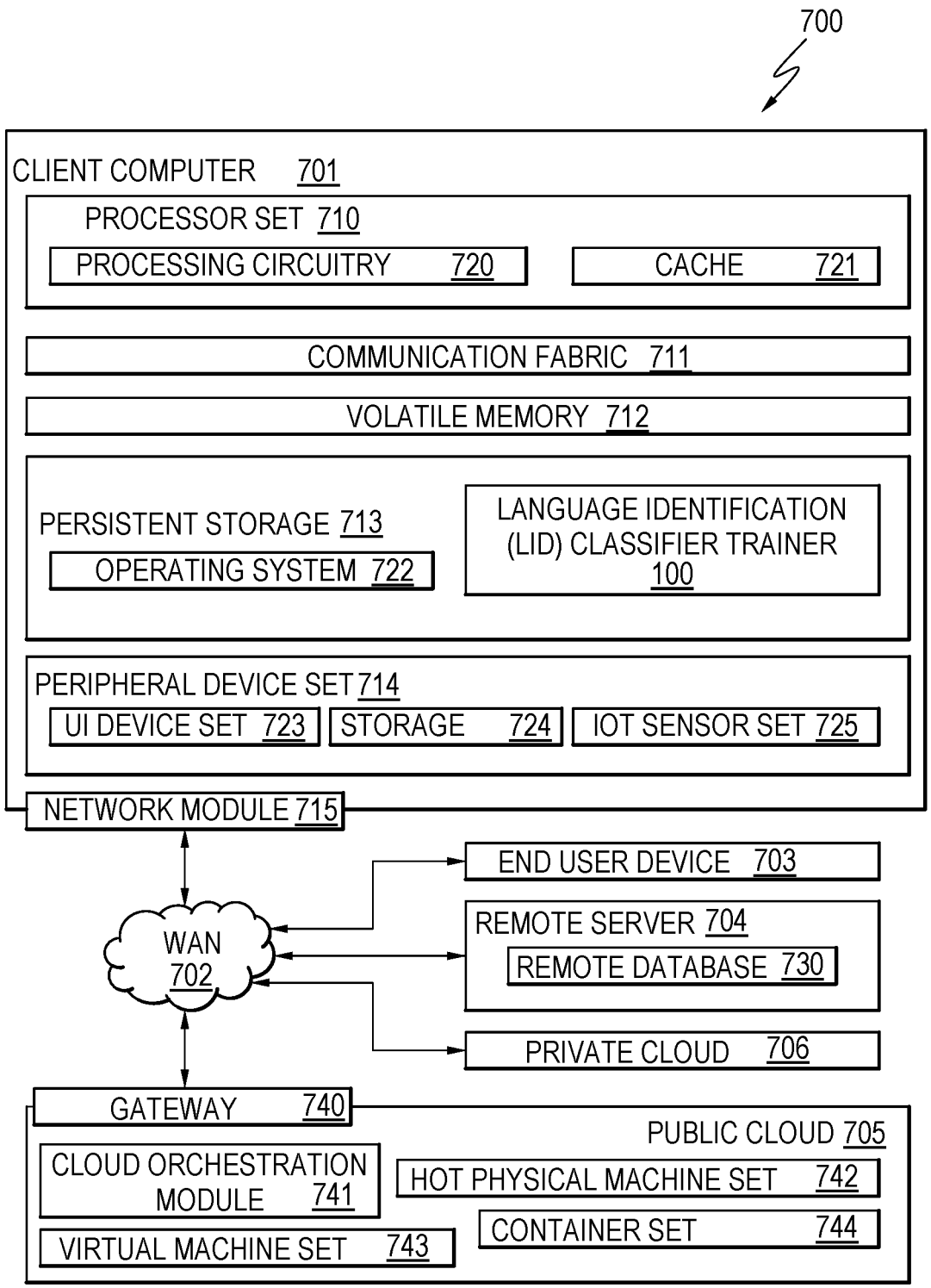
FIG. 7 is a block diagram of an example computing environment that contains an example of an environment for the execution of at least some of the computer code involved in performing the inventive methods, such as training a LID classifier using encoded audio from an encoder of a pre-trained STT system.

FIG. 4 is a process flow diagram of an example method that can train a LID classifier using encoded audio from an encoder of a pretrained RNN-T based STT system. The method 400 can be implemented with any suitable computing device, such as the computing device 300 of FIG. 3 and is described with reference to the system 100 of FIG. 1. For example, the methods described below can be implemented by the processor set 710 or the processor 802 of FIGS. 7 and 8.

At block 402, a processor receives encoded audio from an encoder of a pre-trained speech-to-text (STT) model. For example, the encoder may be a pre-trained RNN-T. In various examples, the encoder may be pre-trained on one language.

At block 404, the processor trains a language identification (LID) classifier to detect a language of the encoded audio using training samples labeled by language. For example, the LID classifier may receive pairs of encoded audio samples with corresponding language labels.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
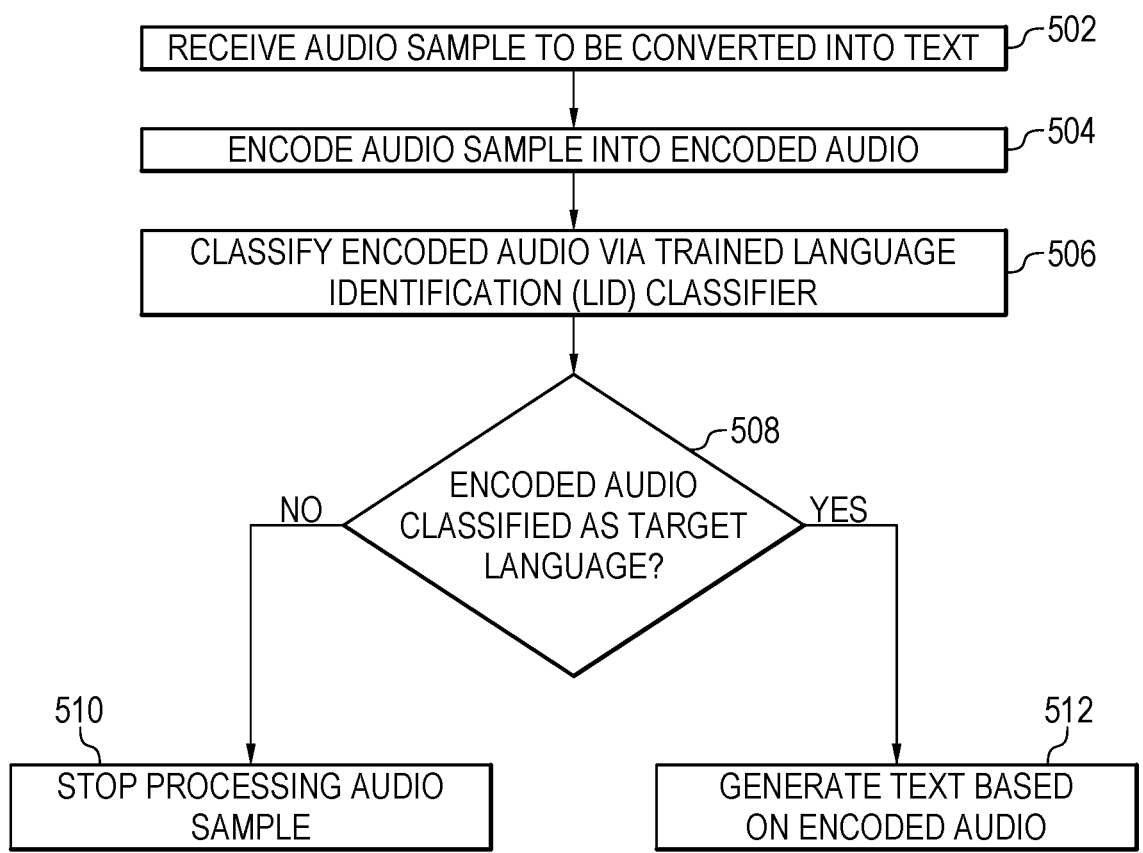
FIG. 5 is a process flow diagram of an example method that can generate text from audio in a target language using a LID classifier trained according to embodiments described herein.

FIG. 5 is a process flow diagram of an example method that can generate text from audio in a target language using a LID classifier trained according to embodiments described herein. The method 500 can be implemented with any suitable computing device, such as the computing device 300 of FIG. 3 and is described with reference to the system 100 of FIG. 1.

At block 502, a processor receives an audio sample to be converted into text. For example, the audio sample may a sample of speech in American English.

At block 504, the processor encodes the audio sample into an encoded audio. For example, the encoded audio may include frame-level feature vectors.

At block 506, the processor classifies the second encoded audio via a trained LID classifier. In some examples, the processor may classify the second encoded audio by applying a softmax function to linear projections of pooled weighted averages and classifying the second encoded audio based on a language class with a highest decimal probability. For example, the LID classifier may have been trained using the method 400 of FIG. 4.

At decision diamond 508, the processor determines whether the encoded audio is classified as a target language. If the processor detects that the encoded audio is not classified as the target language, then the method may continue at block 510. If the processor detects that the encoded audio is classified as the target language, then the method may continue at block 512.

At block 510, the processor stops processing the audio sample. For example, the audio sample may be in an unsupported language and therefore not be able to be converted into text.

At block 512, the processor generates text based on the encoded audio. For example, the processor may continue with the transcription of the audio sample using the encoded features calculated at block 504.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
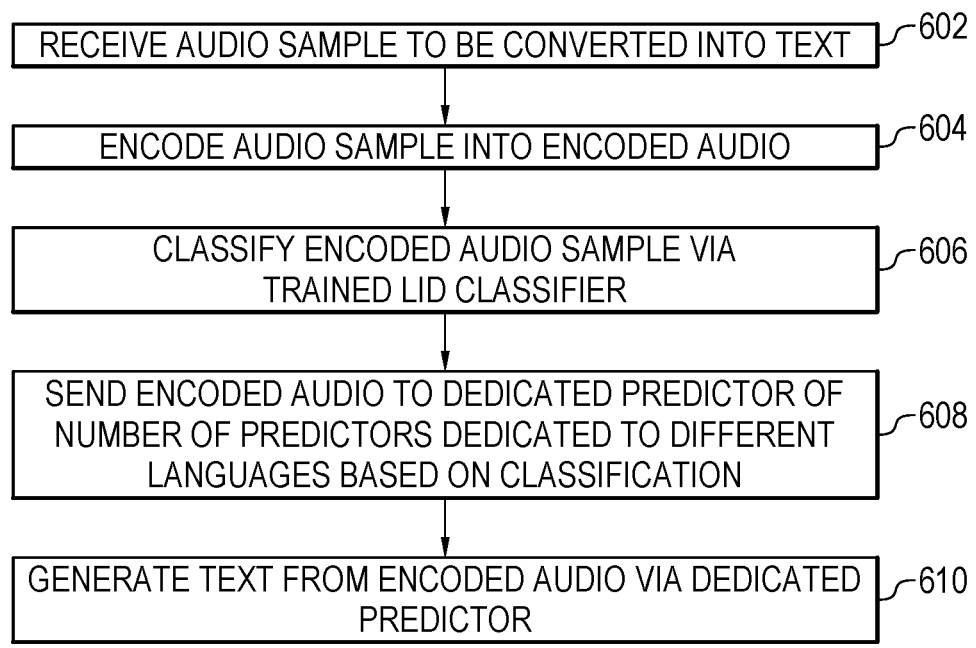
FIG. 6 is a process flow diagram of an example method that can generate text from audio in multiple languages using a LID classifier trained according to embodiments described herein.

FIG. 6 is a process flow diagram of an example method that can generate text from audio in multiple languages using a LID classifier trained according to embodiments described herein. The method 600 can be implemented with any suitable computing device, such as the computing device 300 of FIG. 3 and is described with reference to the system 300 of FIG. 3.

At block 602, a processor receives an audio sample to be converted into text. For example, the audio sample may include speech in American English or US-English.

At block 604, the processor encodes the audio sample into an encoded audio. For example, the encoded audio may include frame-level feature vectors.

At block 606, the processor classifies the encoded audio via a trained LID classifier. In some examples, the processor may classify the second encoded audio by applying a softmax function to linear projections of pooled weighted averages and classifying the second encoded audio based on a language class with a highest decimal probability. For example, the trained LID classifier may have been trained using the method 400 of FIG. 4. As one example, the trained LID classifier may classify the encoded audio as being US-English.

At block 608, the processor selects a dedicated predictor of a number of predictors dedicated to different languages based on the classification. For example, the number of predictors may include a US-English predictor trained on samples of audio with speech in US-English.

At block 610, the processor generates the text from the encoded audio via the dedicated predictor. For example, the processor may generate the text using a US-English spelling.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as a language identification classifier trainer 100. In addition to block 100, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 100, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 200 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Figure 8:
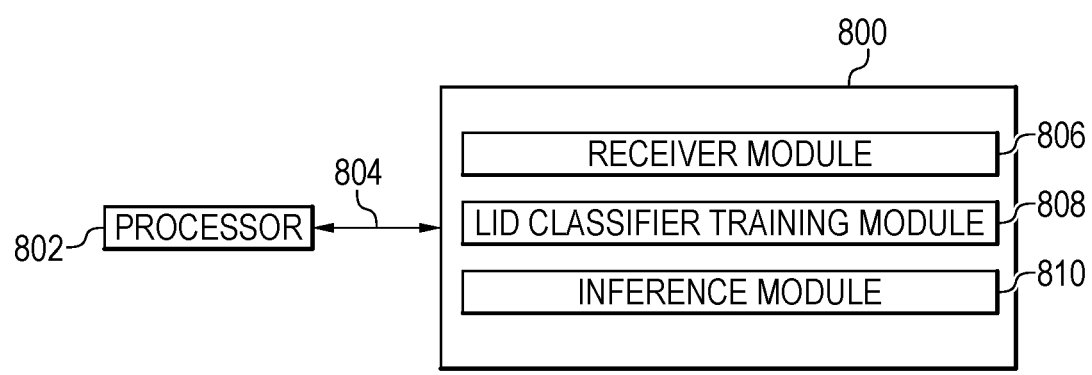
FIG. 8 is an example tangible, non-transitory computer-readable medium that can train a LID classifier using encoded audio from an encoder of a pretrained STT system.

Referring now to FIG. 8, a block diagram is depicted of an example tangible, non-transitory computer-readable medium 800 that can train a LID classifier using encoded audio from an encoder of a pretrained STT system. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 400-600 of FIGS. 4-6.

The various software components discussed herein may be stored on the tangible, non-transitory, computer-readable medium 800, as indicated in FIG. 8. For example, a receiver module 806 includes code to receive encoded audio from an encoder of a pre-trained speech-to-text (STT) model. The receiver module 806 also includes code to receive an audio sample to be converted into text. A language identification (LID) classifier training module 808 includes code to train a language identification (LID) classifier to detect a language of the encoded audio using training samples labeled by language. An inference module 810 includes code to encode the audio sample into a second encoded audio. In some examples, the inference module 810 also includes code to classify the second encoded audio via the trained LID classifier. For example, the inference module 810 may also include code to apply a softmax function to linear projections of a pooled weighted averages and classify the second encoded audio based on a language class with a highest decimal probability. The inference module 810 may also include code to stop processing of the audio sample in response to detecting that the encoded audio is not classified as a target language. In various examples, the inference module 810 also includes code to generate text in the target language based on the second encoded audio and prediction from a predictor of the pre-trained STT model in response to detecting that the second encoded audio is classified as a target language. In some examples, the inference module 810 also further includes code to send the second encoded audio to a dedicated predictor of a number of predictors dedicated to different languages based on the classification. For example, the inference module 810 may also include code to generate the text from the encoded audio via the dedicated predictor.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive an encoded audio from an encoder of a pre-trained speech-to-text (STT) model;
   train a language identification (LID) classifier to detect a language of the encoded audio using training samples labeled by language;
   and the system further comprising the processor to:
   receive an audio sample to be converted into text;
   encode the audio sample into a second encoded audio;
   classify the second encoded audio via the trained LID classifier; and
   generate, in response to detecting that the second encoded audio is classified as a target language, text in the target language based on the second encoded audio and prediction from a predictor of the pre-trained STT model;
   wherein the LID classifier includes weights and linear projections being multiplied in a multiplier; and
   wherein the LID classifier further includes an average pooling layer as a multi-head weighted-average pooling layer.

2. The system of claim 1, wherein the encoder comprises a recurrent neural network transducer (RNN-T) encoder.

3. The system of claim 1, wherein the encoder is pre-trained on one language.

4. The system of claim 1, wherein the STT model comprises a plurality of predictors dedicated to different languages, wherein the LID classifier is to classify a second encoded audio corresponding to an audio sample to be converted into text and select a corresponding dedicated predictor based on the classification.

5. The system of claim 1, wherein the encoder of the STT model is pre-trained with the plurality of predictors for different languages.

6. The system of claim 1, wherein the encoded audio comprises a frame-level feature vector.

7. A computer-implemented method, comprising:
   receiving, via a processor, an encoded audio from an encoder of a pre-trained speech-to-text (STT) model;
   training, via the processor, a language identification (LID) classifier to detect a language of the encoded audio using training samples labeled by language;
   the computer-implemented method further comprising:
   receiving, via the processor, an audio sample to be converted into text;
   encoding, via the processor, the audio sample into a second encoded audio;
   classifying, via the processor, the second encoded audio via the trained LID classifier; and
   sending, via the processor, the second encoded audio to a dedicated predictor of a plurality of predictors dedicated to different languages based on the classification;
   wherein the LID classifier includes weights and linear projections being multiplied in a multiplier; and wherein the LID classifier further includes an average pooling layer as a multi-head weighted-average pooling layer.

8. The computer-implemented method of claim 7, comprising:
receiving, via the processor, an audio sample to be converted into text;
encoding, via the processor, the audio sample into a second encoded audio; and
classifying, via the processor, the second encoded audio via the trained LID classifier.

9. The computer-implemented method of claim 8, comprising stopping, via the processor, processing of the audio sample in response to detecting that the second encoded audio is not classified as a target language.

10. The computer-implemented method of claim 8, comprising generating, via the processor, text in the target language based on the second encoded audio and prediction from a predictor of the pre-trained STT model in response to detecting that the second encoded audio is classified as a target language.

11. The computer-implemented method of claim 7, comprising generating the text from the second encoded audio via the dedicated predictor.

12. The computer-implemented method of claim 7, wherein classifying the second encoded audio comprises applying a softmax function to linear projections of pooled weighted averages and classifying the second encoded audio based on a language class with a highest decimal probability.

13. A computer program product for training language identification classifiers, the computer program product comprising a computer-readable storage medium having program code embodied therewith, the program code executable by a processor to cause the processor to:
receive encoded audio from an encoder of a pre-trained speech-to-text (STT) model;
train a language identification (LID) classifier to detect a language of the encoded audio using training samples labeled by language;
the computer program product further comprising program code executable by the processor to:
receive an audio sample to be converted into text;
encode the audio sample into a second encoded audio;
classify the second encoded audio via the trained LID classifier;
send the second encoded audio to a dedicated predictor of a plurality of predictors dedicated to different languages based on the classification; and
generate the text from the encoded audio via the dedicated predictor;
wherein the LID classifier includes weights and linear projections being multiplied in a multiplier; and
wherein the LID classifier further includes an average pooling layer as a multi-head weighted-average pooling layer.

14. The computer program product of claim 13, further comprising program code executable by the processor to:
receive an audio sample to be converted into text;
encode the audio sample into a second encoded audio; and
classify the second encoded audio via the trained LID classifier.

15. The computer program product of claim 14, further comprising program code executable by the processor to stop processing of the audio sample in response to detecting that the encoded audio is not classified as a target language.

16. The computer program product of claim 14, further comprising program code executable by the processor to generate text in the target language based on the second encoded audio and prediction from a predictor of the pre-trained STT model in response to detecting that the second encoded audio is classified as a target language.

17. The computer program product of claim 13, further comprising program code executable by the processor to apply a softmax function to linear projections of a pooled weighted averages and classify the second encoded audio based on a language class with a highest decimal probability.

* * * * *